UNITED STATES PATENT OFFICE.

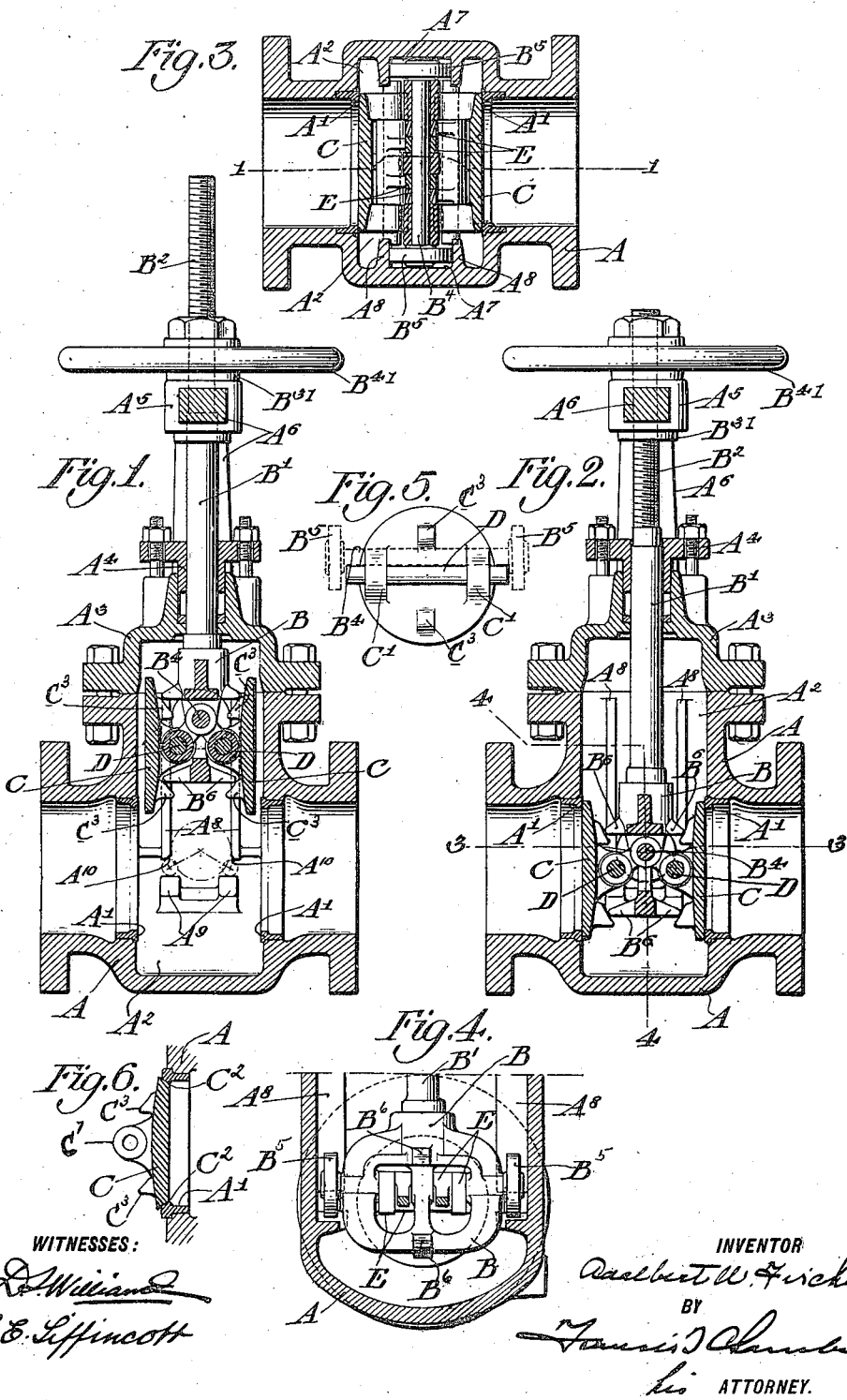
A. W. FISCHER.
GATE VALVE.
APPLICATION FILED MAR. 14, 1907.
961,594.
Patented June 14, 1910.

ADALBERT W. FISCHER, OF PHILADELPHIA, PENNSYLVANIA, ASSIGNOR TO SCHUTTE AND KOERTING COMPANY, OF PHILADELPHIA, PENNSYLVANIA, A CORPORATION OF PENNSYLVANIA.

GATE-VALVE.

961,594.        Specification of Letters Patent.      Patented June 14, 1910.

Application filed March 14, 1907. Serial No. 362,430.

*To all whom it may concern:*

Be it known that I, ADALBERT W. FISCHER, a subject of the Emperor of Germany, residing in the city and county of Philadelphia, in the State of Pennsylvania, have invented a certain new and useful Improvement in Gate-Valves, of which the following is a true and exact description, reference being had to the accompanying drawings, which form a part thereof.

My present invention relates to gate valves, and has for its object to provide a valve of this character which is relatively simple in construction and reliable in operation and in which the connections between the valves proper and the operating stems are such that the valves proper or valve disks in opening are moved, first away from their seats and then transversely thereto, and reversely in closing, and in which the parts are so constructed and arranged that the frictional resistance to the movements and the tendency to injure the weak or relatively easily injured parts of the valve construction are reduced to a minimum.

The various features of novelty which characterize my invention are pointed out with particularity in the claims annexed to and forming a part of this specification. For a better understanding of my invention, however, and the advantages possessed by it, reference may be had to the accompanying drawings and descriptive matter in which I have illustrated and described one of the forms in which my invention may be embodied.

Of the drawings, Figure 1 is a sectional elevation of the valve casing and mechanism taken on the line 1—1 of Fig. 3, showing the valve in the open position. Fig. 2 is a section similar to Fig. 1 with the valve in the closed position. Fig. 3 is a section on the line 3—3 of Fig. 2. Fig. 4 is a section on the line 4—4 of Fig. 2 with the valve head shown in full. Fig. 5 is an elevation of one of the valve disks. And Fig. 6 is a sectional elevation showing a modified form of valve disk and seat.

A indicates the valve casing having oppositely disposed seats $A^1$, $A^1$, between which is located the valve chamber $A^2$ in which the valve head B and parts connected to it are movable transversely of the valve seats, by means of the stem $B^1$ passing through the removable casing head $A^3$ and stuffing box $A^4$.

The stem $B^1$ has a threaded portion $B^2$ which passes through a nut $B^{31}$ journaled in and held against endwise movement by the crosshead $A^5$ carried from the casing head $A^3$ by arms $A^6$. The nut $B^{31}$ is rotated by the hand-wheel $B^{41}$ in the usual manner. The head B carries a shaft $B^4$ extending transversely to the stem and carrying at its ends rollers $B^5$, which extend into channels, or guideways, $A^7$, formed by ribs $A^8$, carried by the side walls of the chamber $A^2$ at the sides of the valve seats and extending parallel to the stem $B^1$.

Each of the two valve disks C, or valves proper has formed on its inner side ears $C^1$, in which is journaled a shaft D extending parallel to the shaft $B^4$. Arms or links E each journaled at one end on the shaft $B^4$ and at the other end on the corresponding shaft D, serve to connect the valve disks to the head.

The shafts D are slightly shorter than the distance between the rollers $B^5$ so that they clear the latter, but are long enough so that their ends provide guide contacting surfaces for engaging the ribs $A^8$. When the valve is in the open position, shown in Fig. 1, each valve disk is held away from its seat by the engagement of the ends of its shaft D with the adjacent rib $A^8$. The lower ends of the ribs $A^8$ are arranged, however, so that when the valve disks are moved into alinement with the valve seats the valve disks are allowed to spread apart and seat themselves. Preferably the corners of the ribs $A^8$ are beveled off as indicated at $A^{10}$. The proper seating is controlled by providing stop shoulders or transverse ribs $A^9$ on the side walls of the chamber $A^2$, beneath the lower ends of the ribs $A^8$. As the valve head is moved down from the position shown in Fig. 1 to the position shown in Fig. 2 the valve disks are held from moving apart by the ribs $A^8$ until the shafts D pass beneath the lower ends of the ribs when the ends of the shafts D engage the lugs $A^9$ and enter the channels or guideways formed between the lower ends of the ribs $A^8$ and the ribs $A^9$. Further downward movement of the head then causes the valve disks to be forced apart and firmly against their seats through the toggle connections formed by the arms E. The position of the shafts D and rollers $B^5$ when the valve disks are in the closed position is shown in dotted lines in Fig. 1.

To insure that each valve disk moves parallel to its valve seat in the initial opening and final closing movements, cam lugs C³ are formed on the inner side of each valve disk, and these coöperate with corresponding cam lugs B⁶ formed on the sides of the head. This parallel movement of the valve disks is also facilitated by locating the shafts D midway between the top and bottom edges of the valve disks, as shown.

Ordinarily in opening or closing a valve of this character the fluid pressure acts in a manner tending to move one valve disk toward its seat and the other away from its seat. With the construction described this lateral pressure on the valve disk is, of course, transmitted to the shaft B and tends to move the latter transversely of the line of movement of the valve stem. This tendency is resisted, however, and any consequent bending of the valve stem prevented by the engagement with the ribs A⁸ of the guide contacting surfaces provided by the guide rolls B⁵. At the same time the toggle connections between the valve disks and the valve head and the cam lugs C¹ and B⁶ cause the valve disks to move without tipping or sliding on the valve seats simultaneously into and out of engagement with the latter. With the arrangement disclosed the rollers B⁵ and the ends of the shafts which form in effect anti-friction rolls insure that the frictional resistance to the operation of the valves is relatively small and valves controlling large pipes or conduits in which the fluid pressure is high may be opened and closed with comparative ease.

To facilitate grinding of the valves and valve seats I preferably make the shafts D readily removable from the ears C¹ so that the grinding may be carried out after removal of the shafts by rotating the valves on their seats.

Instead of making the valves and valve seats so that the surface of contact between each valve and its seat is plane, as in the construction shown in Figs. 1 to 5 inclusive, I prefer in many cases to make the seat engaging surface of each valve disk conical, as indicated at C² in Fig. 6, the valve engaging surface of the valve seat member A being also conical of course. The use of the conical valves and seats is possible with the construction disclosed because of the provision made for moving the valves transversely to their seats in the opening and closing movements in a positive manner and with little frictional retardation.

Having now described my invention, what I claim as new and desire to secure by Letters Patent is,

1. In a gate valve, a casing, a valve stem extending into said casing and movable in the direction of its length, said casing having oppositely disposed valve seats one on each side of the line of movement of the stem, a valve for each seat, one or more links connecting each valve to the stem, guides carried by the stem adjacent its connection to said links, guides connected to the valves, and guides carried by the casing for coöperating with the stem carried guides to hold the stem against lateral movement at all times, and with the guides connected to the valves to cause the valves to move first transversely to the line of movement of the stem and then parallel thereto in opening and reversely in closing.

2. A gate valve casing having oppositely disposed seats, guides for holding the valves in retracted position while moving toward and away from their operative positions, and for preventing lateral movement of the valve stem, and guides for directing the valves toward said seats in combination with a valve stem, arms pivotally secured to said stem and extending on each side thereof, valves pivotally secured to said arms, said valves having guide contacting surfaces arranged to engage the guides in the casing and guide the valves in their determined paths, and said stem having guide contacting surfaces concentric with the pivotal connection between the stem and arms, also engaging the casing guides.

3. In a gate valve, a casing, a valve stem extending into said casing and movable in the direction of its length, said casing having oppositely disposed valve seats one on each side of the line of movement of the stem, a head carried by the stem, guide rolls journaled on said head to turn relatively thereto about an axis transverse to the line of movement of the stem, guide ribs engaging said rolls and carried by the casing one at each side of each guide roll, two sets of arms pivoted to the head, one set extending toward one valve seat and the other toward the other valve seat, valves for the valve seats, one pivoted to each set of arms, guides connected to said valves and engaging the inner sides of said guide ribs when the valves are in the open position, said guide ribs being arranged so that the last mentioned guides clear the sides of the ribs when the valves are closely adjacent their seats, other guide ribs carried by the casing in position to prevent movement of the guides carried by the valve in a direction parallel to the movement of the stem when the valves are closely adjacent their seats, but permitting a transverse movement of said guides at that time.

4. In a gate valve, a casing, a valve stem extending into said casing and movable in the direction of its length, said casing having oppositely disposed valve seats one on each side of the line of movement of the stem, a shaft pivotally supported by said stem within said casing and extending transversely to said stem, a guide roll carried by each end of said shaft, valves, one for each seat, each valve having a shaft extending parallel to the shaft carried by the stem, one or more links connecting each valve shaft with the stem supported shaft, a pair of guide ribs at each side of the valve seats extending parallel to the stem and located one on each side of the corresponding roll, said valve shafts being extended to engage said guide ribs, the latter terminating immediately above the positions of the valve carried shafts when the valves are closely adjacent their seats and being separated by a distance less than the distance between the outer sides of the valve carried shafts when the valves are against their seats and transverse guides carried by the casing against which the underside of the valve shafts engage when the valves are closely adjacent their seats.

5. In a gate valve, a casing, a valve stem extending into said casing and movable in the direction of its length, said casing having oppositely disposed valve seats one on each side of the line of movement of the valve stem and being provided at the sides of the valve seats with guideways extending transversely to the stem, and with guideways extending parallel to the stem and communicating with the first mentioned guideways, a valve for each valve seat, connections between each valve and the stem, guides carried by the stem adjacent the valve connections, said guides working in the guideway extending parallel to the stem, and guides connected with the valves, the last mentioned guides entering said lateral guideways when the valves are near the closing position whereby the initial opening and final closing movements of the valves are transverse to the line of movement to the stem, the last mentioned guides also entering said longitudinal guideways as the valves move farther away from their seats whereby further movement of the valves is in a direction parallel to the movement of the stem.

6. In a gate valve, a casing, a valve stem extending into said casing and movable in the direction of its length, said casing having oppositely disposed conical valve seats one on each side of the line of movement of the stem, a valve for each seat, having a conical seat engaging portion, one or more links connecting each valve to the stem, guides carried by the stem adjacent its connection to said links, guides connected to the valves, and guides carried by the casing for coöperating with the stem carried guides to hold the stem against lateral movement at all times, and with the guides connected to the valves to cause the valves to move first transversely to the line of movement of the stem and then parallel thereto in opening and reversely in closing.

7. In a gate valve, a casing, a valve stem extending into said casing and movable in the direction of its length, said casing having oppositely disposed circular valve seats one on each side of the line of movement of the stem, a valve for each seat having a circular seat engaging face and apertured ears $C^1$ on its back, a shaft passing through and readily removable from the ears at the back of each valve, each shaft having its ends projecting beyond the valve to form casing engaging guides, one or more links each pivotally connected at one end of one or the other of said shafts and at the other end to said stem, and guides carried by the stem adjacent its connection to said links, and guides carried by the casing for coöperating with the stem carried guides to hold the stem against lateral movement at all times, and with the guides formed by the ends of the shafts passing through the valve ears $C^1$ to cause the valves to move first transversely to the line of movement of the stem and then parallel thereto in opening and reversely in closing.

ADALBERT W. FISCHER.

Witnesses:
ARNOLD KATZ,
ERNEST H. HOBBS.